United States Patent [19]

Marietta et al.

[11] Patent Number: 5,541,934
[45] Date of Patent: Jul. 30, 1996

[54] APPARATUS, SYSTEMS AND METHODS FOR ISOLATING FAULTS DURING DATA TRANSMISSION USING PARITY

[75] Inventors: Bryan D. Marietta, Dallas; Douglas A. Oppedahl, Garland, both of Tex.

[73] Assignee: Convex Computer Corporation, Richardson, Tex.

[21] Appl. No.: 545,058

[22] Filed: Oct. 19, 1995

Related U.S. Application Data

[63] Continuation of Ser. No. 131,477, Oct. 4, 1993, abandoned.

[51] Int. Cl.⁶ .................................................. G06F 11/00
[52] U.S. Cl. ........................ 371/20.1; 371/20.5; 371/22.1
[58] Field of Search .............................. 371/20.1, 20.4, 371/20.5, 22.1, 22.5, 19.1, 20.6, 49.3, 48, 25.1, 67.1, 71, 68.1; 370/13, 14, 15, 16, 17, 53

[56] References Cited

U.S. PATENT DOCUMENTS

| | | | |
|---|---|---|---|
| 3,315,228 | 4/1967 | Futerfas et al. | 371/20.1 |
| 3,916,379 | 10/1975 | Dulaney et al. | 371/20.1 |
| 3,975,712 | 8/1976 | Hepworth et al. | 340/147 R |
| 4,410,984 | 10/1983 | Negi et al. | 371/16 |
| 4,819,152 | 4/1989 | Deerfield et al. | 364/200 |
| 4,959,776 | 9/1990 | Deerfield et al. | 364/200 |
| 5,170,338 | 12/1992 | Moritoki et al. | 371/20.1 |
| 5,228,042 | 7/1993 | Gauthier et al. | 371/20.5 |

*Primary Examiner*—Hoa T. Nguyen
*Assistant Examiner*—Phung M. Chung
*Attorney, Agent, or Firm*—Fulbright & Jaworski L.L.P.-Dallas Office

[57] ABSTRACT

Circuitry 300 is disclosed for isolating faults in a path 304 transmitting data words each having at least one data bit and at least one parity bit. Circuitry 300 includes a plurality of exclusive-OR gates 303 each having a first input coupled to the data path 304 for receiving a bit of a one of the data words being transmitted along path 304. A plurality of multiplexers 305 are also provided, each multiplexer 305 including a first input coupled to an output of a corresponding one of the exclusive-OR gates 303 and a control signal input for receiving a control signal. A plurality of registers 306 have an input coupled to an output of a corresponding one of the multiplexers 305 and an output coupled to a second input of a corresponding one of the exclusive-OR gates 303 and a second input of the corresponding one of the multiplexers 305. Each multiplexer 305 is operable to pass a bit presented at the output of the corresponding exclusive-OR gate 305 to the corresponding register 306 in response to a first state of the control signal and pass a bit presented at the output of the corresponding register 306 to the input of the corresponding register 306 in response to a second state of the control signal.

22 Claims, 2 Drawing Sheets

APPARATUS, SYSTEMS AND METHODS FOR ISOLATING FAULTS DURING DATA TRANSMISSION USING PARITY

This is a continuation of application Ser. No. 08/131,477, filed on Oct. 4, 1993 now abandoned.

TECHNICAL FIELD OF THE INVENTION

The present invention relates in general to data processing systems and in particular to apparatus, systems and methods for isolating faults in a processing system.

BACKGROUND OF THE INVENTION

Fault detection/isolation is an important internal function found in most currently available processing systems and in particular in high performance processing systems such as supercomputers. One established method of fault detection/isolation is parity checking. In a parity checking system, each word of data is associated with a parity bit which is set such that the overall word composed of the data bits and the associated parity bit has a predetermined odd or even parity. When data is transferred, a check is performed at the destination to determine if the parity differs from that at the source. If the party does differ at the destination, then a fault has occurred which has inverted one of bits of the word being transferred.

Although parity checking is a conceptually straight forward approach to fault detection/isolation, actual implementation of a parity checking scheme raises a number of difficulties. For example, is not always possible to perform a parity check on a given word of data as it is transferred through a data path with sufficient frequency to precisely isolate the source of any faults should they occur. This is especially true in high speed processing systems where frequent fault checking may either impede data flow or may not be possible at all at certain data flow points. Some of the fastest currently available components, such as the gate arrays, are still to slow to provide the fast device to device communication required to perform parity checking at high data transfer rates. Without the capability of performing fault detection/isolation at such data flow points such as the gate arrays a given word may travel for a substantial distance along a data path, and consequently be subjected to the possibility of corruption, before fault detection/isolation can be performed. In this case, the fault can only be generally isolated to that part of the data path between a pair of endpoints that do have parity checking.

Thus, the need has arisen for apparatus, systems and methods for isolating faults in high performance processing systems.

SUMMARY OF THE INVENTION

According to a first embodiment of the present invention, circuitry is provided for isolating faults in a path transmitting data words, each of the data words having at least one data bit and at least one parity bit. A plurality of exclusive XOR gates are provided, each of which has a first input coupled to the data path for receiving a bit of one of the data words being transmitting on the path. A plurality of multiplexers are provided each of which has a first input coupled to an output of a corresponding one of the exclusive OR gates and a control signal input for receiving a control signal. A plurality of registers are further provided, each of which has an input coupled to an output of a corresponding one of the multiplexers and an output coupled to a second input of a corresponding one of the exclusive OR gates and a second input of the corresponding one of the multiplexers. Each of the multiplexers is operable to pass a bit presented at the output of the corresponding exclusive-OR gate to the corresponding register in response to a first state of the control signal and pass a bit presented at the output of the corresponding register to the input of the corresponding register in response to the second state of the control signal.

According to a second embodiment of the second invention, a data path is provided which has mid-point fault isolation. First endpoint circuitry is included for transmitting data words on the data path, each of the data words including at least one data bit and at least one parity bit and having a preselected parity. Second endpoint circuitry is provided for receiving the data words transmitted by the first endpoint circuitry on the data path. Circuitry is also provided for testing the validity of a data word being transmitted by the first endpoint circuitry and setting a flag in response. Mid-point isolation circuitry is provided which includes a plurality of exclusive-OR gates, each of the exclusive-OR gates having a first input coupled to the data path for receiving a bit of one of the data words being transmitted along the path. A plurality of multiplexers are included in the midpoint isolation circuitry, each of the multiplexers having a first input coupled to an output of a corresponding one of the exclusive-OR gates and a control signal input for receiving the flag. A plurality of registers are included each of which has an input coupled to an output of a corresponding one of the multiplexers and a output coupled to a second input of a corresponding one of the exclusive-OR gates and a second input of the corresponding one of the multiplexers. Each of the multiplexers is operable to pass a bit presented at the output of the corresponding exclusive-OR gate to the corresponding register for storage in response to a first state of the flag and pass a bit presented at the output of the corresponding register to the input of the corresponding register in response to a second state of the flag. Finally, circuitry is provided for performing a parity check on the bits stored in the registers.

According to a further embodiment of the present invention, a method is providing for isolating faults in a path transmitting data words each including at least one data bit and at least one parity bit. A bit of a first one of the data words is received at a first input of a corresponding one of a set of exclusive-OR gates, the first data word having a parity. A bit of a stored data word is received at a second input of the corresponding one of the exclusive-OR gate. The output of each of the set of exclusive-OR gates is stored in a corresponding one of a set of registers. The parity of the data stored in the registers is then checked to isolate faults.

According to an additional embodiment of the present invention, a method is provided for isolating faults in a data path carrying data words from first endpoint circuitry to second endpoint circuitry, each data word having at least one data bit and at least one parity bit. A first one of the data words of a preselected parity is transmitted from the first endpoint circuitry to corresponding first inputs of a set of exclusive-OR gates. A stored second one of the data words is received from a corresponding set of registers at the corresponding second inputs of the set of exclusive-OR gates, the second data word having a parity. A validity flag is generated having a first state indicative that the first data word is valid when transmitted from the first endpoint circuitry. In response to the first state of the flag, the output of the exclusive-OR gates is stored in the registers. A parity check is then performed on the contents of the registers and the first data word passed to the second endpoint circuitry.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
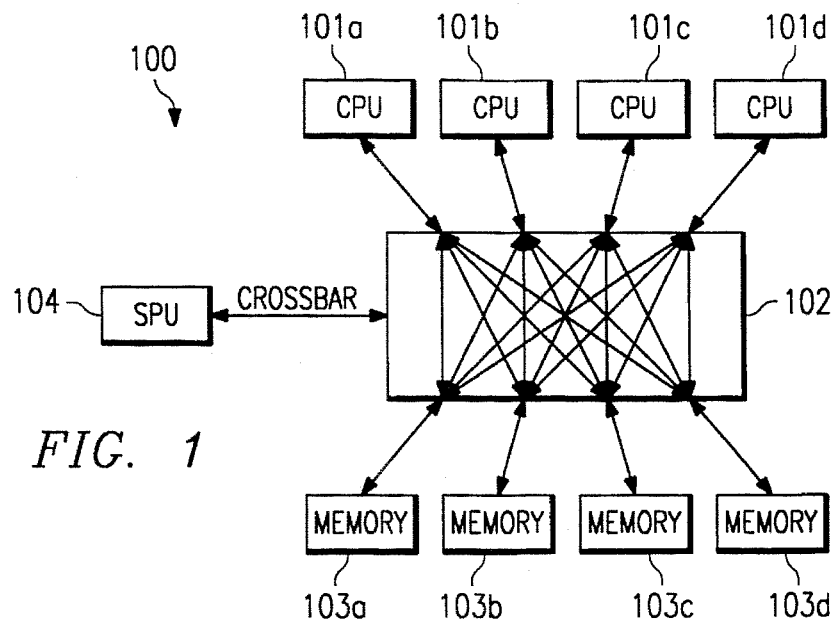
FIG. 1 is a top level functional block diagram of a processing system embodying the principles of the present invention.
Figure 2:
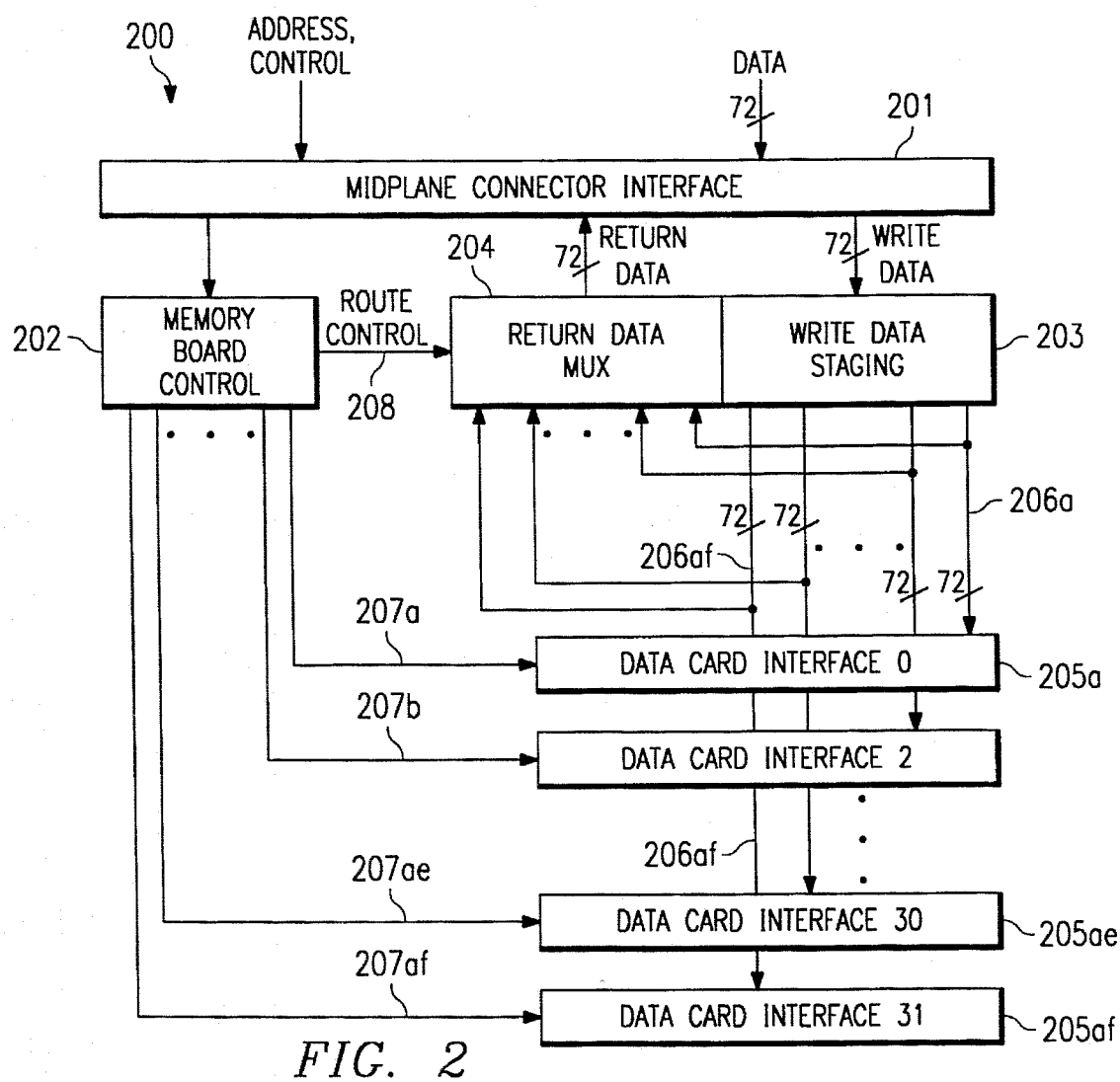
FIG. 2 is a functional block diagram of one of the memory units depicted in FIG. 1.
Figure 3:
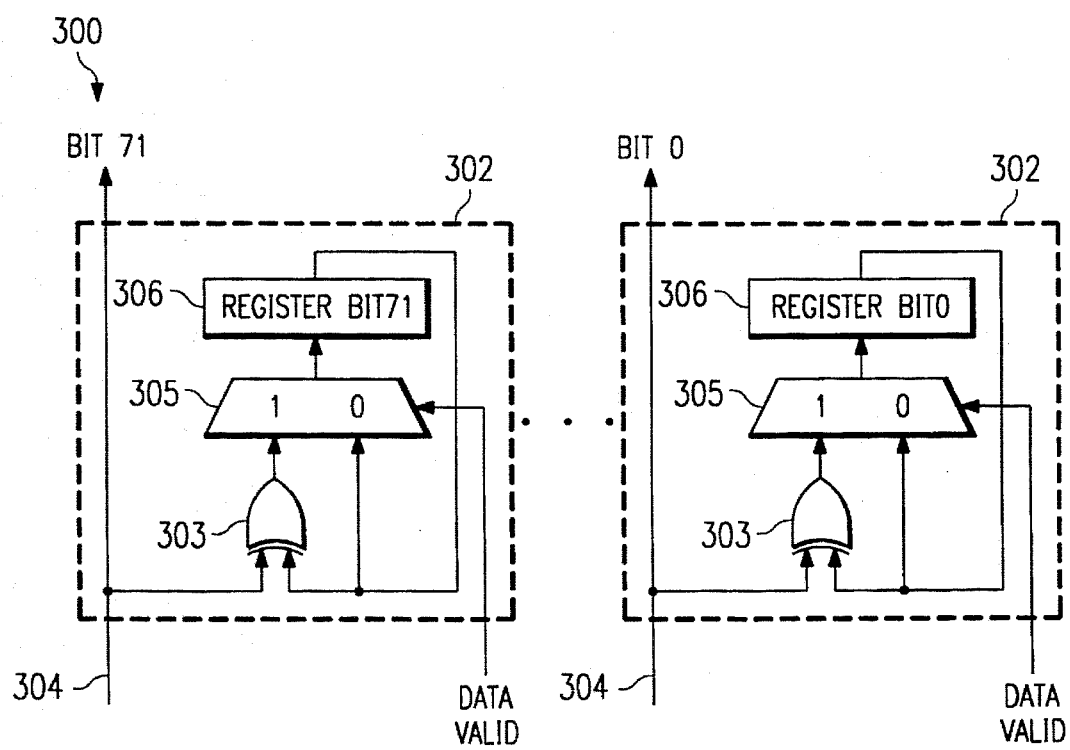
FIG. 3 is a electrical schematic diagram of fault isolation/detection circuitry used in the memory units shown in FIGS. 1 and 2 according to one embodiment of the present invention.

The principles of the present invention and their advantages are best understood by referring to the illustrated embodiment depicted in FIGS. 1-3 of the drawings, in which like numbers designate like parts.

FIG. 1 is a functional block diagram of a processing system 100 according to one embodiment of the present invention. Processing system 100 includes a series of parallel central processing units 101a-101d, a crossbar 102, a series of parallel memory units 103a-103d, and a service processor 104. In the illustrated embodiment, each central processing unit 101 is a vector processor. Crossbar 102 allows for the selective interconnection of a given one of the central processing units 101 with a given one of the memory units 103. In the illustrated embodiment, crossbar 102 is memory address selective, and each memory unit 103 accommodates a different address range for the storage and retrieval of data. If a given CPU 101 requires the performance of a memory operation, that CPU 101 provides instructions designating a desired operating address space and crossbar 102 analyzes the instructions from the given CPU 101 and then controls the transfer of data to and from the corresponding memory unit 103. Service processor 104 handles such functions as system initialization and fault detection/isolation.

FIG. 2 is a detailed functional block diagram of the memory board (motherboard) 200 a selected one of the memory units 103a-103d. Memory board 200 includes a midplane connector interface 201 for receiving data, addresses, and control signals from crossbar 102. In the illustrated embodiment, data is received as 72-bit words which are composed of eight 8-bit bytes data and eight corresponding parity bits (one parity bit per byte of data). Address and control signals from crossbar 102 are routed to memory board control circuitry 202 via midplane connector interface 201. Data being routed to and from crossbar 102 through midplane connector 201 are controlled by write staging circuitry 203 and return data multiplexing 204. Each memory board 200 also includes thirty-two (32) interface units 205 for receiving data cards (daughter boards or cards) (not shown). Each data card interface 205 is coupled to write data staging circuitry 203 and read data multiplexing circuitry 204 via a respective 72-bit bidirectional bus 206. Thus, in the illustrated embodiment where thirty-two data card interfaces 205 (and correspondingly thirty-two data cards) are employed, there are accordingly thirty-two 72-bit bidirectional buses 206a-206af (a total of 2304 separate lines).

In the illustrated embodiment, write data staging circuitry 203 and return data multiplexing circuitry 204 are together constructed by a series of gate arrays. These gate arrays act in essence like very large multiplexers capable of handling 72 lines of input and 2304 lines of output, in the case of write staging circuitry 203, and 2304 input lines and 72 output lines in the case of return data multiplexing circuitry 204. Also, in the illustrated embodiment, memory board control circuitry 202 is constructed of thirty-two individual controllers, each one dedicated to a corresponding data card interface 205 through a corresponding bus 207a-207af.

Memory control circuitry 202 is coupled to return data multiplexing circuitry 204 and write data staging circuitry 203 via a bus 208. Memory board control circuitry 202 handles data requests from a given CPU 101 as directed via crossbar 102. Memory board controller 202 then provides the appropriate addresses and control signals to the selected memory card 206 to perform a write into the data card through the associated data card interface 205 using write data staging circuitry 203, a read from the selected memory card 206 through the corresponding data card interface 205 using return data multiplexing circuitry 204, or a read-modify-write.

It is important to note that in the illustrated embodiment, crossbar 102 and each memory card inserted in a corresponding data card interface 205 are provided with parity checking capability such that errors can be detected and reported at both crossbar 102 and each data card.

FIG. 3 is a detailed electrical schematic drawing depicting midpoint fault isolation circuitry 300 according to the principles of the present invention. In the illustrated embodiment of system 100, each return data multiplexer 204 and each write data staging circuit 203 of each memory unit 103 includes the fault isolation circuitry 300 shown in FIG. 3. Fault isolation circuitry 300 includes a plurality of fault isolation subcircuits 302, one per each bit of data being throughput. In the case of write data staging circuitry 203, the fault isolation circuitry is disposed on the input side while in the case of return data multiplexing circuitry 204, the fault isolation circuitry is on the output side. Thus, in the illustrated embodiment in which each return data multiplexing circuitry 204 and each write data staging circuitry 203 throughputs 72-bits per cycle, each fault isolation circuit 300 correspondingly includes seventy-two fault isolation subcircuits 302.

Each fault isolation subcircuit 302 includes an Exclusive OR gate 303 which has a first input coupled to the through path 304 of the given bit being passed through the corresponding return data multiplexer 204 or write data staging circuitry 203. The output of Exclusive OR gate 303 is coupled to a first input of a multiplexer 305. The output of multiplexer 305 is in turn coupled to a register 306 which has an output coupled back to a second input of Exclusive OR gate 303 and a second input coupled to a second input of multiplexer 305. The control signal input of multiplexer 305 is coupled to receive a valid data signal from memory board control circuitry 202.

In the illustrated embodiment, each of the eight bytes and its associated parity bit have an odd parity when valid (i.e. no single bit inversions). Each overall 72-bit word in turn has an even parity when valid. When a given word is being transferred from crossbar 102 through write data staging circuitry 203 to a given memory card (through its corresponding data card interface 205) a valid data signal is generated by memory board controller 202 indicating that such word was valid at the crossbar 102. Similarly, when a 72-bit word is being transferred from a given data card to the crossbar 102 through return data multiplexing circuitry 204, memory board controller generates the data valid signal indicating that the word was valid at the memory card. Each bit of each 72-bit word is then passed to the corresponding subcircuit 302. If no fault has occurred between the source circuitry (i.e., either the crossbar 102 or the memory words depending on the direction of data flow) and the fault isolation circuitry 300, the word being transferred maintains an even parity. Starting with all zeros in the registers 306, the XOR operation on the error free data and the contents of the registers 306 result in an overall even (0) parity maintained for the new contents of the registers 306. In the illustrated embodiment, service processor 104 is operable to perform a scan on the registers 306 and make a determination of the overall parity of their contents. If a fault is detected at the destination circuitry (i.e., either the crossbar 102 or the memory cards, depending on the direction of the data flow being tested) then that fault can be isolated between the fault isolation circuitry 300 and the destination circuitry since the possibility of an error between the source circuitry and the fault isolation circuitry 300 has been eliminated.

If a given word of data is received at the first inputs of Exclusive OR gates 303 with an inverted bit (i.e., an error) then the overall parity for the contents of registers 306 becomes ODD. Service processor 104 can then scan the registers 306 and determine that an error has occurred between the source circuitry and the fault isolation circuitry 300. Assuming that no more errors occur, XOR gates 303 and registers 306 will maintain the ODD parity (indicating an error has occurred) in the registers 306 with each subsequent 72-bit received.

When invalid data has been transferred from the source circuitry, memory board controller 202 deactivates the data valid signal. In this case, the contents of registers 306 are also preserved with time, in the state such contents were in prior to the receipt of the indication that the data from the source circuitry is invalid.

Although the present invention and its advantages have been described in detail, it should be understood that various changes, substitutions and alterations an be made herein without departing from the spirit and scope of the invention as defined by the appended claims.

What is claimed is:

1. Circuitry for isolating faults in a path transmitting data words, each said data word having at least one data bit and at least one parity bit, comprising:

a plurality of XOR gates, each of said XOR gates having first and second inputs, said first input coupled to said path for receiving a bit of one of said words being transmitted on said path;

a plurality of multiplexers, each of said multiplexers having a first input coupled to an output of a corresponding one of said XOR gates, a second input coupled to said second input of said corresponding one of said XOR gates, and a control signal input for receiving a control signal;

a plurality of registers, each of said registers having an input coupled to an output of a corresponding one of said multiplexers and an output coupled to a second input of a corresponding one of said XOR gates and said second input of said corresponding one of said multiplexers; and wherein each of said multiplexers is operable to pass a bit presented at said output of a corresponding said XOR gate to said corresponding register in response to a first state of a said control signal and pass a bit presented at said output of said corresponding register to said input of said corresponding register in response to a second state of said control signal.

2. The circuitry of claim 1 wherein said first state of said control signal comprises a logical 1 and said second state of said control signal comprises a logical zero.

3. The circuitry of claim 1 wherein said control signal comprises a valid data flag indicating that a corresponding said word as originally transmitted on said path were valid.

4. The circuitry of claim 3 wherein said path transmits said words from first endpoint circuitry to second endpoint circuitry, said valid flag indicating that a vector was valid data at said first endpoint circuitry.

5. The circuitry of claim 1 wherein each said word comprises at least one byte of data bits and at least one associated parity bit per byte of data bits.

6. The circuitry of claim 1 and further comprising a parity check circuit for performing a parity check on said words in said registers.

7. A data path having midpoint fault isolation, said data path comprising:

first endpoint circuitry for transmitting data words on said data path, each said word comprising at least one data bit and at least one parity bit, and each said word having a preselected parity;

second endpoint circuitry for receiving said data words transmitted by said first endpoint circuitry on said data path;

test circuitry for testing validity of a given said data word being transmitted by said first endpoint circuitry and setting a flag indicative of the validity of said given word; and midpoint fault isolation circuitry including:

a plurality of XOR gates, each of said XOR gates having first and second inputs, said first input coupled to said path for receiving a bit of said given word of said data words being transmitted on said path;

a plurality of multiplexers, each of said multiplexers having a first input coupled to an output of a corresponding one of said XOR gates, a second input coupled to said second input of said corresponding one of said XOR gates, and a control signal input for receiving said flag;

a plurality of registers, each of said registers having an input coupled to an output of a corresponding one of said multiplexers and an output coupled to a second input of a corresponding one of said XOR gates and said second input of said corresponding one of said multiplexers, wherein each of said multiplexers is operable to pass a bit presented at said output of said corresponding XOR gate to said corresponding register for storage in response to a first state of a said flag and pass a bit presented at said output of said corresponding register to said input of said corresponding register in response to a second state of said flag; and a parity check circuit for performing a parity check on bits stored in said registers.

8. The data path of claim 7 and further comprising a determining circuitry for determining the validity of said data words as received by said second endpoint circuitry.

9. The data path of claim 7 wherein said first endpoint circuitry comprises memory circuitry.

10. The data path of claim 7 wherein said first endpoint circuitry comprises a crossbar.

11. The data path of claim 7 wherein said second endpoint circuitry comprises memory circuitry.

12. The data path of claim 7 wherein said second endpoint circuitry comprises a crossbar.

13. A method for isolating faults in a path transmitting data words each including at least one data bit and at least one parity bit, comprising the steps of:

receiving each bit of a first one of the data words at a first input of a corresponding one of a set of XOR gates, the first data word having a parity;

receiving each bit of a data word stored in a corresponding one of a set of registers at a second input of the corresponding one of the XOR gates;

storing an output of each of the set of XOR gates in said corresponding one of a set of registers;

checking the parity of the data stored in the registers to isolate faults in the words being transmitted along the path, and wherein said step of storing comprises the substeps of:

receiving a validity flag; and in response to a first state of the validity flag, passing the output of the set of XOR gates to an input of the register.

14. The method of claim 13 and further comprising the step of restoring the bit of data in the corresponding one of the set of the registers in response to a second state of the flag indicating that the first data word is invalid.

15. The method of claim 13 wherein said step of checking the validity of the data stored in the corresponding one of the set of registers comprises the step of performing a parity check.

16. The method of claim 13 wherein said step of storing the output of the XOR gate comprises the substep of passing the output of the XOR gate to an input of the corresponding one of the set of registers through a multiplexer in response to the flag.

17. The method of claim 13 wherein the parity of the first data word is an even parity.

18. A method for isolating faults in a path carrying data words from first endpoint circuitry to second endpoint circuitry, each word having at least one data bit and at least one parity bit, comprising the steps of:

transmitting from the first endpoint circuitry a first one of the data words of a preselected parity to corresponding first inputs of a set of XOR gates;

receiving from a corresponding set of registers a stored second one of the data words at corresponding second inputs of the set of XOR gates, the second data word having a parity;

generating a validity flag having a first state indicative that the first data word is valid when transmitted from the first endpoint circuitry;

in response to the first state of the flag, storing an output of XOR gates in the registers;

performing a parity check on the data words stored in the registers; and passing the first data word to the second endpoint circuitry.

19. The method of claim 18 and further comprising the step of performing a validity check at the second endpoint.

20. The method of claim 18 and further comprising the step of re-storing the second data word in the register in response to a second state of the flag indicating that the first data word is invalid when transmitted from the first endpoint circuitry.

21. The method of claim 18 wherein said first endpoint circuitry comprises a memory.

22. The method of claim 18 wherein said first endpoint circuitry comprises a crossbar.

* * * * *